US010655532B2

(12) United States Patent
Jacob et al.

(10) Patent No.: US 10,655,532 B2
(45) Date of Patent: May 19, 2020

(54) ELECTRIC CHARGING DEVICE WITH ROTOR COOLING

(71) Applicant: BorgWarner Inc., Auburn Hills, MI (US)

(72) Inventors: Stefan Jacob, Neustadt an der Weinstrasse (DE); Volkmar Gauckler, Muenchweiler an der Alsenz (DE)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 16/091,555

(22) PCT Filed: Apr. 3, 2017

(86) PCT No.: PCT/US2017/025682
§ 371 (c)(1),
(2) Date: Oct. 5, 2018

(87) PCT Pub. No.: WO2017/176610
PCT Pub. Date: Oct. 12, 2017

(65) Prior Publication Data
US 2019/0107043 A1    Apr. 11, 2019

(30) Foreign Application Priority Data
Apr. 7, 2016    (DE) .................. 10 2016 205 848

(51) Int. Cl.
*F02B 37/04*    (2006.01)
*F02B 39/00*    (2006.01)
(Continued)

(52) U.S. Cl.
CPC ............ *F02B 37/04* (2013.01); *F02B 39/005* (2013.01); *F02B 39/10* (2013.01); *H02K 9/06* (2013.01);
(Continued)

(58) Field of Classification Search
CPC .. F02B 2039/166; F02B 37/04; F02B 39/005; F02B 39/10; F02B 2039/164; H02K 9/06; H02K 9/193
See application file for complete search history.

(56) References Cited

U.S. PATENT DOCUMENTS 5,144,175 A * 9/1992 Craggs ..................... H02K 1/32
                                                       310/61
5,904,471 A * 5/1999 Woollenweber ........ F02B 37/16
                                                       417/307

(Continued)

OTHER PUBLICATIONS

KR1020130011884, Choi, Moon Chang, Jan. 30, 2013.*
Written Opinion and International Search Report dated Jul. 11, 2017, in International Application No. PCT/US2017/025682.

*Primary Examiner* — Jesse S Bogue
(74) *Attorney, Agent, or Firm* — Eric L. Doyle; Stephan A. Pendorf; Patent Central LLC

(57) ABSTRACT

A charging device for an internal combustion engine with rotor cooling has a shaft, a compressor wheel mounted on the shaft, a stator housing and a stator. The stator is arranged in the stator housing. The charging device additionally has a rotor arranged rotatably fixed on the shaft The rotor is surrounded by the stator. A first fan device is arranged for common rotation with the shaft in order to generate a circulating air flow in the stator housing for cooling the rotor.

19 Claims, 1 Drawing Sheet

(51) Int. Cl.
*F02B 39/10* (2006.01)
*H02K 9/06* (2006.01)
*H02K 9/193* (2006.01)
*F02B 39/16* (2006.01)

(52) U.S. Cl.
CPC ........ H02K 9/193 (2013.01); *F02B 2039/164* (2013.01); *F02B 2039/166* (2013.01)

(56) References Cited

U.S. PATENT DOCUMENTS

| | | | | |
|---|---|---|---|---|
| 6,798,079 B2 * | 9/2004 | Nelson | ............. | F01D 25/12 |
| | | | | 290/2 |
| 6,891,290 B2 * | 5/2005 | Nagayama | ............. | H02K 1/32 |
| | | | | 310/58 |
| 6,914,355 B2 * | 7/2005 | Cardenas | ............. | F01P 5/02 |
| | | | | 310/58 |
| 7,160,086 B2 * | 1/2007 | Maceyka | ............. | H02K 9/06 |
| | | | | 310/63 |
| 7,459,817 B2 * | 12/2008 | VanLuik | ............. | H02K 1/32 |
| | | | | 310/216.004 |
| 7,462,964 B2 * | 12/2008 | Nagayama | ............. | H02K 9/00 |
| | | | | 310/58 |
| 8,395,288 B2 * | 3/2013 | Huynh | ............. | H02K 9/06 |
| | | | | 310/52 |
| 8,736,122 B2 * | 5/2014 | Kamp | ............. | H02K 5/161 |
| | | | | 310/58 |
| 9,273,598 B2 * | 3/2016 | An | ............. | F02B 39/10 |
| 10,374,487 B2 * | 8/2019 | Ikonen | ............. | H02K 9/06 |
| 2007/0228847 A1 * | 10/2007 | Kim | ............. | H02K 1/32 |
| | | | | 310/61 |
| 2008/0042502 A1 * | 2/2008 | VanLuik | ............. | H02K 1/32 |
| | | | | 310/89 |
| 2012/0306206 A1 | 12/2012 | Agrawal et al. | | |
| 2015/0008771 A1 * | 1/2015 | Lee | ............. | H02K 9/06 |
| | | | | 310/62 |
| 2017/0257007 A1 * | 9/2017 | Braam | ............. | H02K 9/08 |

\* cited by examiner

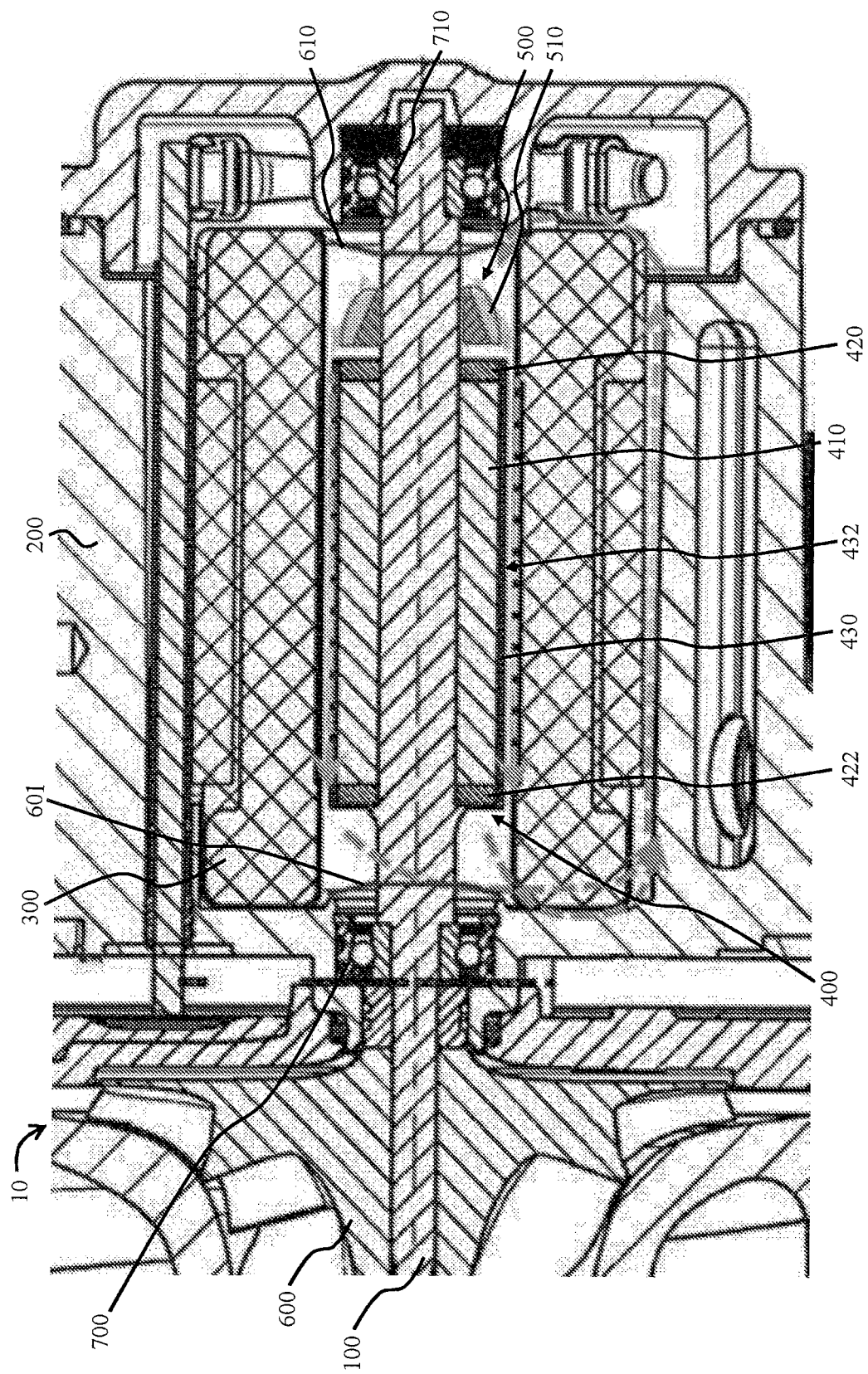

ELECTRIC CHARGING DEVICE WITH ROTOR COOLING

FIELD OF THE INVENTION

The present invention relates to an electric charging device for an internal combustion engine with rotor cooling.

BACKGROUND INFORMATION

Increasingly more vehicles of the recent generation are being equipped with charging devices. In order to achieve the target demands and the legal requirements, it is imperative to promote development in the complete drive train and also to optimize the individual components as well as the system as a whole with respect to their reliability and efficiency.

Known examples include, for example, exhaust gas turbochargers, in which a turbine wheel is driven by the exhaust gas flow of the internal combustion engine. A compressor wheel, which is arranged with the turbine wheel on the common shaft, compresses the fresh intake air for the engine. By this means, the amount of air or oxygen, which is available to the engine for combustion, is increased, which in turn leads to an increased performance of the internal combustion engine. The disadvantage in exhaust gas turbocharges is that their rotation rate or performance is dependent on the exhaust gas flow, thus on the engine load. At low engine speeds, in particular, this may negatively affect the effectiveness and efficiency of exhaust gas turbochargers.

An alternative to exhaust gas turbochargers is presented by electric turbochargers, also called eBoosters. In these turbochargers, the shaft, on which the compressor wheel is arranged, is not driven by the exhaust gas flow from the engine or via a turbine wheel, but instead by an electric motor driving the shaft. For this purpose, a rotor is arranged on the shaft with a stator around the rotor. Shaft, rotor, and stator are surrounded by a stator housing. At high load and during performance peaks, these components heat up strongly. To prevent temperatures in the turbocharger that are too high, it is known to provide cooling ducts, through which a coolant is supplied, for cooling the stator in the stator housing. However, in these turbochargers, very high temperatures still arise in the area of the not-cooled rotor. This limits the performance during demand peaks. The same applies for electric or electrically supported charging devices, like hybrid versions made from an exhaust gas turbocharger and an electric turbocharger, in which the drive of the compressor wheel is possible both by the exhaust gas flow via a turbine wheel and also via an electric motor arranged on the shaft, most often between the turbine wheel and the compressor wheel.

The object of the present invention is accordingly to provide a charging device for an internal combustion engine which enables cooling of the rotor.

BRIEF SUMMARY OF THE INVENTION

The present invention relates to a charging device for an internal combustion engine according to claim 1.

The charging device according to the invention has a shaft, a compressor wheel mounted on the shaft, a stator housing and a stator, wherein the stator is arranged in the stator housing. The charging device comprises in addition a rotor arranged rotatably fixed on the shaft, wherein the rotor is surrounded by the stator, and a first fan device, wherein the first fan device is arranged for common rotation with the shaft in order to generate an air flow circulating in the stator housing for cooling the rotor. By this means, in that a cooling air flow is guided past the rotor by the fan device, longer boost phases are enabled, since the heat generated by the rotor is better discharged, and thus overheating of the charging device may be prevented. Thus, there arises a generally lower thermal load for the rotor and its magnet. During demand peaks in particular, a higher efficiency is provided by the charging device according to the invention than by conventional charging devices/eBoosters without rotor cooling. The circulating air flow may additionally also discharge heat from the bearing seats of the bearings for the shaft, in particular from the bearing seat of the bearing past which the re-cooled air flows. The bearing is also indirectly cooled by the flow around the seat.

In embodiments, the air flow may be guided in the axial direction along the rotor, between the rotor and stator. In particular, the air flow may be guided along the rotor in the direction of the compressor wheel.

In embodiments, which are combinable with all previously described embodiments, the air flow may be guided back in the axial direction between the stator and stator housing and/or through the stator housing. Thus, the air flow takes up the heat while circulating between the rotor and stator, and then discharges the heat at the stator housing.

In embodiments, which are combinable with all previously described embodiments, at least one duct, through which the air flow is guided, may be provided on and/or in the stator housing. The at least one duct may be configured as a groove and/or a hole. In particular, at least 3 ducts, preferably at least 5 ducts, extremely preferably at least 8 ducts may be provided. Optionally, the ducts may be arranged uniformly distributed in the circumferential direction. Furthermore, recesses, projections, or the like, which function to increase the surfaces to improve a heat exchange between the circulating air and the stator housing, may be provided in the area of the ducts.

In embodiments, which are combinable with all previously described embodiments, the stator housing may be fluid-cooled, in particular water-cooled. The stator is effectively cooled by the fluid-cooling. The stator housing may comprise a fluid inlet, a fluid outlet, and a fluid duct for this purpose. The fluid cooling also has advantages for cooling the rotor. The air flow, which is guided along or through the stator housing, may discharge more heat to the stator housing due to the available fluid cooling. This enables a continuous cooling of the rotor and bearing seat/bearing by the air flow circulating within the enclosed space of the stator housing. The air flow is thus heated by flowing past the rotor, by which means the rotor itself is cooled. Subsequently, the air flow is cooled again by flowing past the fluid-cooled stator housing. The re-cooled air may then be guided past the bearing seat of the distal bearing of the shaft, with respect to the compressor wheel, and along the rotor in order to cool the same.

In embodiments, which are combinable with all previously described embodiments, the rotor may comprise a magnet and also first and second cover disks, wherein the magnet is arranged between the first and the second cover disk. The rotor may additionally comprise a sleeve, wherein the sleeve extends in the axial direction and surrounds the magnet radially outwardly. The sleeve may be roughened on its radially outward outer surface and/or have a structure increasing the surface area. The structure may be formed by grooves, projections, and/or teeth. A roughened surface or a structure increasing the surface area enables a better heat transport from the rotor through the circulating air flow.

In embodiments, which are combinable with all previously described embodiments, a second fan device may be provided, wherein the first fan device is arranged in the area of the distal end of the rotor, when viewed from the compressor wheel, and the second fan device may be arranged in the area of the proximal end of the rotor.

In embodiments, the first fan device and the first cover disk may be configured as an integral component and, in the case it is present, the second fan device and the second cover disk may also be configured as an integral component. Alternatively, the first fan device may be a separate component and be fastened on the shaft; optionally, in case it is present, the second fan device may be a separate component and be fastened on the shaft. The first fan device and the optional, where present, second fan device may be glued to the shaft, pressed on the shaft, contracted onto the shaft, or screwed to the shaft.

In embodiments, which are combinable with all previously described embodiments, the first fan device and the optional, where present, second fan device may be manufactured at least partially from a plastic material and/or a metal, in particular a light-weight metal. The embodiment of the fan device with the lowest possible weight has the advantage that force influences caused by the fan device, and thus imbalances and torques on the shaft, may be prevented.

In embodiments, which are combinable with all previously described embodiments, the first fan device and the optional, where present, second fan device may comprise multiple blades arranged in the circumferential direction in order to generate the air flow when the fan device(s) rotate commonly with the shaft.

In embodiments, which are combinable with all previously described embodiments, at least one first heat shield may be provided, wherein the heat shield may be arranged on the shaft and is designed to protect a first bearing of the shaft from heat and from the air flow. The first heat shield may be arranged between the first bearing and a proximal end of the rotor relative to the compressor wheel. In addition, a second heat shield may be provided, wherein the second heat shield may be arranged between a distal end of the rotor, relative to the compressor wheel, and a second bearing of the shaft. The first heat shield may comprise first guide means to guide the air flow, in particular wherein the first guide means may be suitable to guide the air flow radially outward. The second heat shield may comprise second guide means in order to guide the air flow, in particular wherein the second guide means may be suitable for guiding the air flow in the direction of the rotor. The guide means are advantageous, as they may contribute to conveying a uniformly circulating air flow.

BRIEF DESCRIPTION OF THE DRAWING

FIG. 1 shows a cutaway view of one embodiment of the charging device according to the invention.

DETAILED DESCRIPTION OF THE INVENTION

In the following, embodiments for the charging device with rotor cooling according to the invention are described by way of the figure.

FIG. 1 shows an example of an embodiment according to the invention of the charging device in the form of an electric turbocharger or eBooster 10. Charging device 10 has a shaft 100, a compressor wheel 600 mounted on shaft 100, a stator housing 200 and a stator 300. Charging device 10 additionally comprises a rotor 400 which is arranged rotatably fixed on shaft 100. As is clear in FIG. 1, rotor 400 is surrounded by stator 300 and both stator 300 and also rotor 400 are arranged within stator housing 200. The embodiment from FIG. 1 further shows a first fan device 500, wherein first fan device is arranged for common rotation with shaft 100. In the example from FIG. 1, first fan device 500 is configured as a separate component which is mounted on shaft 100. Additional details regarding this and regarding alternatives to the configuration of fan device 500 are later in the text. Fan device 500 generates a circulating air flow via the common rotation with shaft 100 for cooling rotor 400 in stator housing 200 during operation of charging device 10. Because a cooling air flow is supplied by fan device 500 past rotor 300, the rotor is continuously cooled due to the improved heat discharge and heats up more slowly, for which reason longer boost phases may be enabled. A generally lower thermal load arises for rotor 400 and its magnet. A higher performance is provided by charging device 10 according to the invention, in particular during demand peaks, than by conventional charging devices/eBoosters without cooling of rotor 400. The circulating air flow may additionally discharge heat from the bearing seats of the bearings 700, 710 for shaft 100, in particular at the bearing seat of bearing 710, past which the re-cooled air flows. The bearing itself is also indirectly cooled by the flow past the seat.

The air flow (parts of the air flow are indicated in FIG. 1 by dashed arrows) thereby runs preferably in the axial direction along rotor 400, between rotor 400 and stator 300 (across the entire circumference of rotor 400) and in the direction of compressor wheel 600. In the area of the end of rotor 400 and before bearing 700 of shaft 100, the air flow is then guided radially outward (likewise across the entire circumference) in order to be guided back in the axial direction between stator 300 and stator housing 200 and/or through stator housing 200. Thus, the air flow takes on heat during circulation between rotor and stator, and discharges the heat again at the stator housing.

To guide the air flow back, a duct may be provided on and/or in stator housing 200, through which the air flow is guided (not shown in FIG. 1). In particular, at least 3 ducts, preferably at least 5 ducts, extremely preferably at least 8 ducts may be provided. The duct(s) may be configured, for example, as grooves and/or as holes. The ducts may be arranged uniformly distributed in the circumferential direction. Likewise not shown in FIG. 1, recesses, projections, or the like, may be provided in the area of the ducts and function to increase the surface. By this means, the heat exchange between the circulating air and the stator housing may be further improved.

The cooling of the circulating air flow is particularly effective when flowing past or flowing through stator housing 200 if stator housing 200 is fluid cooled. In particular, stator housing 200 may be, for example, water cooled. Stator 200 is effectively cooled by the fluid cooling. Stator housing 200 may comprise for this a fluid inlet, a fluid outlet, and a fluid duct. In FIG. 1, the fluid duct is depicted in stator housing 200 in the lower part of the figure. The coolant is supplied to the fluid duct via the fluid inlet. The fluid duct itself runs in the circumferential direction in the stator housing. The coolant is discharged again through the fluid outlet so that a continuous coolant flow is generated in the fluid duct, by means of which a continuous cooling of stator housing 200 and additionally of stator 300 is guaranteed. The fluid cooling also has advantages for the cooling of rotor 400. The air flow, which is guided along or through stator housing 200, is more strongly cooled by the available fluid cooling than in the case of a stator housing 200 without fluid cooling, as the air flow may discharge more heat to stator housing 200. This enables an effective and continuous cooling of rotor 400 and the bearing seat/bearing due to the circulating air flow within the enclosed space of stator housing 200. The air flow thereby heats while flowing past rotor 400, by which means rotor 400 is cooled. Subsequently, the air flow cools off again by flowing through fluid-cooled stator housing 200. The re-cooled air is then guided again past the bearing seat of distal bearing 710 of shaft 100, with respect to compressor wheel 600, and along rotor 400 in order to cool the same.

As is clear in FIG. 1, rotor 400 has a magnet 410 and also first and second cover disks 420, 422, wherein magnet 410 is arranged between first cover disk 420 and second cover disk 422. In the embodiment from FIG. 1, rotor 400 additionally has a sleeve 430, wherein sleeve 430 extends in the axial direction and surrounds magnet 410 radially outwards. Sleeve 430 may be roughened on its radially outward outer surface 432 (not shown in FIG. 1). Alternatively or additionally, outer surface 432 may have a structure increasing the surface area. The structure may be formed, for example, by grooves, projections, and/or teeth. A roughened surface or a structure increasing surface area enables a better heat transport from rotor 400 through the circulating air flow. In case no sleeve 430 is provided for rotor 400, the roughened surface or the structures increasing the surface area may also be provided directly on the radially outer surface of rotor 400, e.g. on the outer surface of the magnet itself.

In one embodiment alternative of the charging device, a second fan device is provided in addition to first fan device 500. First fan device 500 is then arranged in the area of the distal end of rotor 400, when viewed from compressor wheel 600 (for example, as shown in the embodiment of FIG. 1). The second fan device may then be arranged, for example, in the area of the proximal end of rotor 400. The proximal end of rotor 400, relative to compressor wheel 600, is that end of rotor 400 which is arranged closer to compressor wheel 600. Correspondingly, the distal end of rotor 400 is that end of rotor 400 which is located further away from the compressor wheel.

An embodiment is depicted in FIG. 1 in which first fan device 500 is configured as a separate component which is fixed to shaft 100. If a second fan device is provided, then this may likewise be provided as a separate component that is fixed on shaft 100. First fan device 500 and the optional, where present, second fan device may, for example, be glued to shaft 100, pressed on shaft 100, contracted on shaft 100, or screwed to shaft 100. As an alternative to a separate configuration, first fan device 500 and first cover disk 420 may be configured as an integral component. This applies analogously, to the second fan device, where present, and second cover disk 422, which may likewise be configured as an integral component.

First fan device 500 and the optional, where present, second fan device may be manufactured at least partially from a plastic material and/or a metal, in particular a light-weight metal (for example aluminum or magnesium). The embodiment of the fan device with the lowest possible weight has the advantage that force influences through the fan device(s), and thus imbalances and torques on shaft 100, may be prevented.

For all configurations of the fan device(s), regardless of whether as separate components or as integral with cover disk(s) 420, 422, first fan device 500 and the optional, where present, second fan device may comprise multiple blades arranged in the circumferential direction. The blades 510 are indicated in FIG. 1 for fan device 500 of charging device 10. Blades 510 generate the air flow or increase the air flow when fan device 500 or the fan devices commonly rotate with shaft 100.

The embodiment depicted in FIG. 1 additionally has first and second heat shields 600, 610, wherein heat shields 601, 610 are arranged on shaft 100. Alternatively, only one heat shield or no heat shield may be provided. Heat shields 601, 610 are suitable for protecting first and second bearing 700, 710 of shaft 100 from heat and from the air flow. As is clear in FIG. 1, first heat shield 601 is arranged between first bearing 700 and the proximal end of rotor 400, with respect to compressor wheel 600. Second heat shield 610 is arranged between the distal end of rotor 400, with respect to compressor 600, and second bearing 710 of shaft 100. First heat shield 600 may additionally comprise guide means for guiding the air flow. In particular, the first guide means may be suitable for guiding the air flow radially outward. Second heat shield 610 may comprise second guide means for guiding the air flow. The second guide means may be suitable for guiding the air flow in the direction of rotor 400 (the guide means are not shown in FIG. 1). The guide means are advantageous as they may contribute to conveying a uniformly circulating air flow.

Although the present invention has been described above and is defined in the attached claims, it should be understood that the invention may also be alternatively defined according to the following embodiments:

1. A charging device (10) for an internal combustion engine, comprising:
   a shaft (100);
   a compressor wheel (600) mounted on the shaft (100);
   a stator housing (200);
   a stator (300), wherein the stator (300) is arranged in the stator housing (200);
   a rotor (400) arranged rotatably fixed on the shaft (100), wherein the rotor (400) is surrounded by the stator (300),
   characterized by a first fan device (500), wherein the first fan device (500) is arranged for common rotation with the shaft (100) in order to generate a circulating air flow in the stator housing (200) for cooling the rotor (400).
2. The charging device according to Embodiment 1, characterized in that the air flow is guided in the axial direction along the rotor (400), between the rotor (400) and the stator (300), optionally wherein the air flow is guided along the rotor (400) in the direction of the compressor wheel (600).
3. The charging device according to Embodiment 1 or Embodiment 2, characterized in that the air flow is guided back in the axial direction between the stator (300) and the stator housing (200) and/or through the stator housing (200).
4. The charging device according to any one of the preceding embodiments, characterized in that at least one duct, through which the air flow is guided, is provided on and/or in the stator housing (200).
5. The charging device according to Embodiment 4, characterized in that the at least one duct is configured as a groove and/or hole.
6. The charging device according to Embodiment 4 or Embodiment 5, characterized in that at least 3 ducts, preferably at least 5 ducts, extremely preferably at least 8 ducts are provided, optionally wherein the ducts are arranged uniformly distributed in the circumferential direction.

7. The charging device according to any one of the preceding embodiments, characterized in that the stator housing (200) is fluid cooled, in particular, water cooled.
8. The charging device according to Embodiment 7, characterized in that the stator housing (200) has a fluid inlet, a fluid outlet, and a fluid duct.
9. The charging device according to any one of the preceding embodiments, characterized in that the rotor (400) comprises a magnet (410) and also first and second cover disks (420, 422), wherein the magnet (410) is arranged between the first cover disk (420) and the second cover disk (422).
10. The charging device according to Embodiment 9, characterized in that the rotor (400) comprises a sleeve (430), wherein the sleeve (430) extends in the axial direction and surrounds the magnet (410) radially outwardly.
11. The charging device according to Embodiment 10, characterized in that the sleeve (430) is roughened on its radially outward outer surface (432) and/or has a structure increasing the surface area.
12. The charging device according to Embodiment 11, characterized in that the structure is formed by grooves, projections, and/or teeth.
13. The charging device according to any one of the preceding embodiments, characterized in that a second fan device is provided, wherein the first fan device (500) is arranged in the area of the distal end of the rotor (400), when viewed from the compressor wheel (600), and the second fan device is arranged in the area of the proximal end of the rotor (400).
14. The charging device according to any one of Embodiments 9 through 13, characterized in that the first fan device (500) and the first cover disk (420) are configured as an integral component, optionally, in which case dependent on Embodiment 13, wherein the second fan device and the second cover disk (422) are configured as an integral component.
15. The charging device according to any one of Embodiments 1 through 13, characterized in that the first fan device (500) is a separate component and is fixed on the shaft (100), optionally, in which case dependent on Embodiment 13, wherein the second fan device is a separate component and is fixed on the shaft (100).
16. The charging device according to Embodiment 15, characterized in that the first fan device (500) and optionally, in which case dependent on Embodiment 13, the second fan device are glued on the shaft (100), pressed on the shaft (100), contracted on the shaft (100) or screwed to the shaft (100).
17. The charging device according to any one of the preceding embodiments, characterized in that the first fan device (500) and, optionally, in which case dependent on Embodiment 13, the second fan device are manufactured at least partially from a plastic material and/or a metal, in particular a light-weight metal.
18. The charging device according to any one of the preceding embodiments, characterized in that the first fan device (500) and optionally, in which case dependent on Embodiment 13, the second fan device comprise multiple blades (510) arranged in the circumferential direction in order to generate the air flow when the fan device (500), or the fan devices, rotate commonly with the shaft (100).
19. The charging device according to any one of the preceding embodiments, characterized in that at least one first heat shield (600, 610) is provided, wherein the heat shield (600, 610) is arranged on the shaft (100) and is designed to protect a first bearing (700, 710) of the shaft (100) from heat and from the air flow.
20. The charging device according to Embodiment 19, characterized in that the first heat shield (600) is arranged between the first bearing (700) and a proximal end of the rotor (400), with respect to the compressor wheel (600).
21. The charging device according to Embodiment 19 or Embodiment 20, characterized in that a second heat shield (610) is additionally provided, wherein the second heat shield (610) is arranged between a distal end of the rotor (400), with respect to the compressor wheel (600), and a second bearing (710) of the shaft (100).
22. The charging device according to any one of Embodiment 19 through 21, characterized in that the first heat shield (600) comprises first guide means for guiding the air flow, in particular wherein the first guide means are suitable for guiding the air flow radially outward.
23. The charging device according to Embodiment 21 or Embodiment 22, characterized in that the second heat shield (610) comprises second guide means for guiding the air flow, in particular wherein the second guide means are suitable for guiding the air flow in the direction of the rotor (400).

The invention claimed is:
1. A charging device (10) for an internal combustion engine, comprising:
   a shaft (100);
   a compressor wheel (600) mounted on the shaft (100);
   a stator housing (200);
   a stator (300), wherein the stator (300) is arranged in the stator housing (200);
   a rotor (400) arranged rotatably fixed on the shaft (100), wherein the rotor (400) is surrounded by the stator (300); and
   a first fan device (500), wherein the first fan device (500) is arranged for common rotation with the shaft (100) in order to generate an air flow circulating in a closed loop in the stator housing (200) for cooling the rotor (400), and
   wherein the air flow generated by the first fan device (500) runs the full length of the rotor (400) in a first axial direction between the rotor (400) and the stator (300), is then guided radially outward, and then is guided back in an opposite axial direction the full length of the rotor (400) (a) between the stator (300) and the stator housing (200) and/or (b) axially through the stator housing (200), and is then returned to flow again the full length of the rotor (400) in a first axial direction between the rotor (400) and the stator (300).
2. The charging device according to claim 1, wherein the air flow is guided in the axial direction along the rotor (400), between rotor (400) and stator (300).
3. The charging device according to claim 1, wherein at least one duct, through which the air flow is guided, is provided on and/or in the stator housing (200), wherein the duct is configured as a groove and/or hole.
4. The charging device according to claim 3, wherein at least 3 ducts are provided.
5. The charging device according to claim 1, wherein the rotor (400) comprises a magnet (410) and also first and second cover disks (420, 422), wherein the magnet (410) is arranged between the first cover disk (420) and the second cover disk (422), and wherein the rotor (400) comprises a sleeve (430), wherein the sleeve (430) extends in the radial direction and surrounds the magnet (410) radially outwardly.
6. The charging device according to claim 5, wherein the sleeve (430) is roughened on its radially outward outer surface (432) and/or has a structure increasing the surface area; wherein the structure is formed by grooves, projections, and/or teeth.

7. The charging device according to claim 1, wherein a second fan device is provided, wherein the first fan device (500) is arranged in the area of the distal end of the rotor (400), when viewed from the compressor wheel (600), and the second fan device is arranged in the area of the proximal end of the rotor (400).

8. The charging device according to claim 5, wherein the rotor (400) comprises a magnet (410) and also first and second cover disks (420, 422), wherein the magnet (410) is arranged between the first cover disk (420) and the second cover disk (422), wherein the rotor (400) comprises a sleeve (430), wherein the sleeve (430) extends in the radial direction and surrounds the magnet (410) radially outwardly, and wherein
the first fan device (500) and the first cover disk (420) are configured as an integral component.

9. The charging device according to claim 1, wherein the first fan device (500) is a separate component and is fixed on the shaft (100).

10. The charging device according to claim 1, wherein the first fan device (500) comprises multiple blades (510) arranged in the circumferential direction in order to generate the air flow when the fan device (500) rotates commonly with the shaft (100).

11. The charging device according to claim 1, wherein at least one first heat shield (601, 610) is provided, wherein the heat shield (601, 610) is arranged on the shaft (100) and is designed to protect a first bearing (700, 710) of the shaft (100) from heat and from the air flow, wherein the first heat shield (601) is arranged between the first bearing (700) and the rotor (400).

12. The charging device according to claim 11, wherein a second heat shield (610) is additionally provided, wherein the second heat shield (610) is arranged between the rotor (400) and a second bearing (710) of the shaft (100).

13. The charging device according to claim 11, wherein the first heat shield (600) comprises first guide means for guiding the air flow.

14. The charging device according to claim 1, wherein the air flow is guided in the axial direction along the rotor (400), between rotor (400) and stator (300), in the direction of the compressor wheel (600).

15. The charging device according to claim 3, wherein at least 5 ducts are provided.

16. The charging device according to claim 3, wherein at least 8 ducts are provided.

17. The charging device according to claim 4, wherein the ducts are arranged uniformly distributed in the circumferential direction.

18. The charging device according to claim 1, wherein the stator housing (200) is water cooled.

19. A charging device (10) for an internal combustion engine, comprising:
a shaft (100);
a compressor wheel (600) mounted on the shaft (100);
a stator housing (200), wherein the stator housing (200) is liquid cooled;
a stator (300), wherein the stator (300) is arranged in the stator housing (200);
a rotor (400) arranged rotatably fixed on the shaft (100), wherein the rotor (400) is surrounded by the stator (300); and
a first fan device (500), wherein the first fan device (500) is arranged for common rotation with the shaft (100) in order to generate an air flow circulating in a closed loop in the stator housing (200) for cooling the rotor (400), and
wherein circulating air flow generated by the first fan device (500) runs the full length of the rotor (400) in a first axial direction between the rotor (400) and the stator (300), is then guided radially outward, and then is guided back in an opposite axial direction the full length of the rotor (400) (a) between the stator (300) and the liquid cooled stator housing (200) and/or (b) axially through the liquid cooled stator housing (200), and
is then returned to flow again the full length of the rotor (400) in the first axial direction between the rotor (400) and the stator (300).

* * * * *